United States Patent Office 3,330,619
Patented July 11, 1967

3,330,619
PHOSPHORUS RECOVERY METHOD
Harold J. Herbst, Wheat Ridge, Colo., assignor to Monsanto Company, a corporation of Delaware
No Drawing. Filed Sept. 19, 1963, Ser. No. 310,156
3 Claims. (Cl. 23—107)

This invention relates to methods of recovering phosphorus values and more particularly to methods of recovering phosphorus values from treated raw materials containing the same, an illustration of such material being the ferrophosphorus produced in some localities as a byproduct of elemental phosphorus production.

Elemental phosphorus is commercially produced on a relatively large scale from phosphate rock in a number of western states, including the states of Idaho, Montana, Wyoming, and Utah, and it is well-known that the phosphate rock from such areas contains substantial quantities of metal values including vanadium, chromium and iron. In the electric furnace process for producing elemental phosphorus from this raw material, metals of the above-type become concentrated in the ferrophosphorus byproduct, and the ferrophosphorus usually contains from about 3 to 10% vanadium, 20 to 30% phosphorus, 3 to 6% chromium, and 50 to 60% iron. The specific form of these constituents in ferrophosphorus is not known with certainty. There have been numerous efforts to recover the metal values from the ferrophosphorus on a commercial scale, especially the more valuable metal values such as vanadium and chromium. One such method, the so-called "soda roast," in general, comprises heating ferrophosphorus in the presence of oxygen and either an alkali metal carbonate (usually sodium carbonate), alkali metal hydroxide (usually sodium hydroxide), or a mixture of these two materials. The roasting operation, if properly conducted, results in a large percentage of the vanadium, chromium and phosphorus originally present in the raw material being transformed into compounds which are water-soluble and which can be extracted with an aqueous solvent. A primary advantage of this process is that the solubilization which is effected is selective and only a small percent of contaminants such as iron or the like present in the ferrophosphorus are solubilized.

Although the soda roast process is, in general, concerned with the recovery of the more valuable metal values, such as vanadium and chromium, from an aqueous solution it can be appreciated that such a process could be materially enhanced commercially if a method could be found which permits the recovery of phosphorus values substantially free of vanadium values from the aqueous leach solution especially in view of the significant phosphorus content of the ferrophosphorus.

It is, therefore, a primary object of this invention to provide an economical and efficient process for recovering phosphorus values from a soda roast ferrophosphorus.

It is an object of this invention to provide an economical and efficient process for recovering phosphorus values substantially free of vanadium values from an aqueous leach solution of a soda-roast ferrophosphorus.

It is another object of this invention to provide an economical and efficient process for recovering phosphorus values substantially free of vanadium values from an aqueous solution containing vanadium values, said aqueous solution being a leach solution of a soda roast ferrophosphorus.

It is a further object of this invention to provide an economical and efficient process for recovering the trisodium salt of phosporus substantially free of vanadium values from an aqueous solution containing vanadium values, said aqueous solution being a leach solution of a soda roast ferrophosphorus.

It is a still further object of this invention to provide an economical and efficient process for recovering phosphorus values from a soda roast ferrophosphorus which is suitable as feed for producing elemental phosphorus in the electric furnace process and/or as an animal feed supplement.

These, as well as other objects of this invention, are accomplished by a process which comprises crystallizing alkali metal phosphate salts from an aqueous leach solution of a soda roast ferrophosphorus with the solution having a pH below about 11.5. It has been found that although alkali metal phosphate salts may be crystallized from an aqueous leach solution having a pH above about 11.5, there is also, in addition, large quantities of alkali metal vanadate salts crystallized. Although the exact reason for the pH sensitivity is not known, it is believed that above a pH of about 11.5, the orthovanadate is the stable chemical species and its alkali metal salts are isomorphic with the alkali metal phosphate salts and thereby co-crystallize with the alkali metal phosphate salts, while below a pH of about 11.5 the pyrovanadate and/or metavanadate is the stable chemical species and its alkali metal salts do not co-crystallize with the alkali metal phosphate salts to the extent shown by the sodium orthovanadate salts. The pH of the aqueous solutions herein, unless otherwise indicated, are the pH of the solutions at about 25° C.

In general, the soda roast process entails roasting ferrophosphorus with an alkali metal carbonate, alkali metal hydroxide or mixtures of these materials. In most cases sodium carbonate and sodium hydroxide mixtures are used because of their ready availability and relative inexpensiveness although other alkali metal carbonates and hydroxides can be used which include potassium carbonates and hydroxides and lithium carbonates and hydroxides. Usually the ferrophosphorus and the mixture of sodium carbonate and sodium hydroxide are in particulate form of about ½ inch diameter and smaller. Additionally, about .7 to about 1.1 lbs. of $Na_2O$ per lb. of ferrophosphorus are usually used with between about 60% to about 80% of the $Na_2O$ supplied by the sodium hydroxide. Suitable temperatures for conducting the roasting operation are between about 1500° F. and about 1900° F. Suitable time periods for roasting are between about 30 minutes and about 10 hours.

All of the chemical reactions that occur in the soda roast process are not fully understood nor is it fully understood just why certain constituents of the ferrophosphorus, such as phosphorus, vanadium and chromium, are transformed into water-soluble compounds. In theory, it can be proposed that the soda roast process entails an oxidation reaction and a salt forming reaction which can be represented over-all when using a mixture of sodium carbonate and sodium hydroxide as follows:

(1) 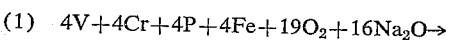

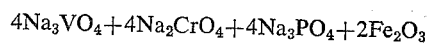

It is, therefore, useful to consider the soda roast ferrophosphorus material suitable for use in practicing the present invention to be based upon percent oxidation and percent by weight of alkali metal present. Percent oxidation can be readily determined by the amount of oxygen pickup of the ferrophosphorus raw material during the soda roast process with 100% oxidation considered to be the oxygen pickup equivalent to the reaction shown by Equation 1, i.e., formation of $VO_4$, $PO_4$, $CrO_4$ and $Fe_2O_3$ from V, P, Cr and Fe present in the ferrophosphorus. Percent alkali metal can readily be determined on a soda roast ferrophosphorus material by elemental analysis.

In general, any ferrophosphorus raw material which has been soda roasted is suitable for use in practicing this invention, however, soda roast ferrophosphorus characterized as being over about 40% oxidized and containing over about 10% by weight of alkali metal is usually preferred and soda roast ferrophosphorus characterized as being over about 75% oxidized and containing over above 20% by weight of alkali metal is especially preferred.

Following roasting, the soda roast ferrophosphorus is leached with an aqueous solvent in order to solubilize the phosphorus, vanadium and chromium values in the roasted material. For this leaching operation, any aqueous solvent can be employed although an aqueous solvent having a pH between about 4 to about 12 is preferred with an aqueous solvent having a pH between about 6 to 8 being especially preferred. In particular are the aqueous solvents consisting essentially of water and having the foregoing pH ranges. The amount of the aqueous solvent employed should be held to near the minimum necessary to adequately extract the aforementioned values from the roasted material. A primary reason for this is that by most procedures it is more convenient to recover soluble phosphorus compounds from a relatively concentrated solution than from a dilute solution. However, to avoid possible undesirable precipitation in various stages of the process, the amount of aqueous solvent preferably used is between about 1:1 to about 3:1 on a weight ratio of aqueous solvent to ferrophosphorus with a weight ratio between about 1.5:1 and 2:1 being especially preferred. It will be apparent that there is no operative upper limit as to the amount of the aqueous solvent that can be employed since if the aqueous leach solution is too dilute to permit satisfactory recovery of the phosphorus values it can be concentrated by evaporation of excess solvent. When conducted properly, and when using the preferred aqueous solvent, the aqueous leach solution usually has a pH of at least about 11.5.

The temperature at which the aqueous extraction of the roasted material is conducted may vary as much as between the freezing and boiling temperature of the aqueous solvent, however, it has been found that the rate of dissolution is temperature dependent and, therefore, the aqueous extraction is preferably carried out between above about 60° C. and below the boiling temperature of the solvent in order to shorten the process time and, therefore, aid in making the process more economical. In general, by utilizing the foregoing preferred temperatures, the aqueous extraction operation may be carried out within about 5 hours. The manipulative procedure employed in carrying out the aqueous extraction of the roasted material is relatively unimportant. Extracting procedures which can be employed include a slurrying and decantation technique, or, as another example, a counter current percolation technique. Slurrying and filtering have been found to be quite satisfactory and is generally preferred.

Following the leaching operation when using the preferred aqueous solvent, the aqueous leach liquor usually has a pH of about 11.5 or above and contains, among other things, the solubilized phosphorus values, vanadium values and chromium values. It has been found, as previously mentioned, that in separating the phosphorus and vanadium values by crystallization, the phosphorus and vanadium values tend to cocrystallize above a pH of about 11.5, but below this pH it is possible to recover the phosphorus values substantially free of vanadium values, i.e., containing less than about 10% by weight of vanadium based on weight of phosphorus present. Therefore, it is usually necessary to adjust the pH of the aqueous leach liquor obtained from the leaching operation to a pH below about 11.5, followed by crystallization of the phosphorus values. Depending upon the desired form of the phosphorus to be recovered, the pH may be adjusted to as low as a pH of about 6.0. Below a pH of about 6 the chromium and vanadium values begin to crystallize out with the phosphorus values to an undesirable extent. It is preferred when crystallizing the sodium salts that the pH be adjusted to within the ranges of about 8.0 to about 10.5 for recovering disodium orthophosphate and within the ranges of about 10.5 to about 11.5 to recover the trisodium orthophosphate, with the recovery of the trisodium orthophosphate being especially preferred because, among other things, the pH need not be lowered to the extent required for the disodium orthophosphate. Especially preferred for recovering the trisodium orthophosphate is a pH between about 11.1 and 11.3. With the crystallization operation conducted at a pH between about 6 and 8, a mixture of mono-sodium and di-sodium phosphate salts can be recovered which can be used to advantage in preparing the widely used sodium tripolyphosphate. The amount of the acid necessary depends upon, inter alia, the concentration of the acid used, the pH of the aqueous leach liquor following the leaching operation and the desired form of the phosphorus values to be recovered. In any event, it can be determined experimentally.

The pH adjustment can be accomplished by use of any acidic material, soluble in an alkaline solution, including organic acids and inorganic acids. In general, organic acids such as oxalic acid, citric acid, formic acid, picric acid, tartaric acid, and the like are suitable, as well as inorganic acids such as hydrochloric acid, nitric acid, sulfuric acid, phosphoric acid, and the like. Preferred acids are the stronger acids, i.e., those having a pK greater than about 4, and especially preferred are such inorganic acids which include sulfuric acid, phosphoric acid, hydrochloric acid and nitric acid. The ionization constant of an acid (pK) as used herein refers to the dissociation of an acidic electrolyte at room tempearture, i.e., about 25° C., and is equal to the product of the activities of each of the ions produced by the dissociation (if more than one ion of a given kind is produced, its activity is raised to the corresponding power) divided by the activity of the undissociated molecules with the activities assumed to be in their standard states at infinite dilution.

With the aqueous leach liquor containing the solubilized values at a pH of below about 11.5, the phosphorus values can be recovered therefrom by various methods, such as crystallization by removing water from the aqueous solution by evaporation, allowing the phosphorus values to crystallize by cooling a relatively hot saturated aqueous solution, allowing the phosphorus values to crystallize from a saturated solution by seeding the solution and the like. The crystallized phosphorus values can be removed from the aqueous leach by any suitable means, such as centrifuging, filtration, decantation and the like.

Since the preferred manner of carrying out the aqueous extraction operation is by use of temperatures between above about 60° C. and below the boiling temperature of the aqueous solvent, the preferred method of recovering the phosphorus values is by allowing such to crystallize by cooling the aqueous leach liquor containing the solubilized phosphorus values and removing the crystals from the leach liquor by centrifuging. It is rarely necessary to cool the solution below ambient temperatures, i.e., usually about 25° C., for sufficient crystallization although temperatures as low as about 15° C. can be used. However, for temperatures below about 15° C., the solubilities of the chromium and vanadium values at pH's between about 6.0 and 11.5 are such that at lower temperatures they begin to crystallize out with the phosphorus values to an undesirable extent. Depending on the form of phosphorus to be recovered, degree of saturation of the desired phosphorus form in the aqueous leach liquor and the like, temperatures between about 15° C. and 55° C. are usually sufficient for crystallization. This method of recovering phosphorus values, therefore, although permitting a wide degree of temperature variation, does not require stringent or extreme temperature conditions for crystallization, such as extremely low temperatures, i.e., about 0° C. to about 6° C., thereby aiding the economics of the process.

Although the phosphorus values recovered as hereinbefore described may be used "as is" or further purified for use, a further process economy can result from reacting the recovered alkali metal phosphates with an alkaline earth metal oxide or hydroxide, and preferably the calcium and magnesium oxides and hydroxides, in order to recover the alkali metal material for recycle to the soda roast operation and recover the alkaline earth metal phosphates for recycle to an electric furnace for further processing into elemental phosphorus and/or, with the calcium phosphates, as an animal feed supplement. Especially preferred is the use of the calcium oxide or hydroxide. In general, it is only necessary to admix the reactants in sufficient water for the reaction to take place, as illustrated by the following reaction using trisodium phosphate and calcium oxide as the reactants to form hydroxylapatite and sodium hydroxide:

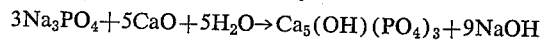

$$3Na_3PO_4 + 5CaO + 5H_2O \rightarrow Ca_5(OH)(PO_4)_3 + 9NaOH$$

Usually the reaction can be aided by the use of agitation, an excess of the alkaline earth metal oxide or hydroxide and sufficient water to form a sufficiently nonviscous slurry. In general, the agitation should preferably be sufficient to ensure substantially complete reaction. The alkaline earth metal oxides or hydroxides can preferably be present in amounts between about 5% and 80% solids by weight of the aqueous slurry with between about 5% and about 40% solids by weight being especially preferred. In addition, although stoichiometric amounts or even less of the alkaline earth metal oxide or hydroxide can be used, it is preferred to use excess amounts with excess amounts as high as 100% being suitable in some instances, although excess amounts of between about 10% and about 40% are preferred. The alkaline earth metal phosphate can be recovered from the reaction medium by means, such as, filtration, centrifuging and the like.

The following examples are presented to illustrate the invention with parts by weight being used unless otherwise indicated.

*Example I*

In this example, quantities as indicated of aqueous leach liquor at about 70° C. obtained from the aqueous extraction of a soda roast ferrophosphorus were adjusted in pH to the values as indicated using $H_2SO_4$ and the liquor cooled to a temperature of about 25° C. The resulting crystals were separated from the liquor by a centrifuge and the crystals and mother liquor analyzed as to their phosphorus, vanadium and chromium content. The following table indicates the results of the tests:

TABLE 1

| Total Weight of Aqueous Leach Liquor | pH at 25° C. | Trisodium orthophosphate crystals | | | | Mother liquor | | | |
|---|---|---|---|---|---|---|---|---|---|
| | | Weight Percent | V | Cr | P | Weight Percent | V | Cr | P |
| (1) | 600 | 12.12 | 261 | 1.09 | .08 | 7.07 | 339 | .56 | .81 | .4 |
| (2) | 400 | 12.03 | 161 | .91 | .03 | 7.74 | 239 | .57 | .72 | .5 |
| (3) | 520 | 12.02 | 201 | .95 | 0 | 7.10 | 318 | .66 | .68 | .64 |
| (4) | 368 | 11.5 | 190 | .35 | .05 | 7.33 | 178 | 2.20 | 1.06 | 1.35 |
| (5) | 531 | 11.2 | 102 | .13 | .02 | 7.74 | 429 | 1.83 | .80 | 1.41 |
| (6) | 519 | 11.0 | 225 | .19 | .006 | 7.53 | 294 | 2.01 | .43 | 2.14 |
| (7) | 461 | 10.7 | 261 | .19 | .009 | 7.57 | 167 | 3.53 | .72 | 2.11 |
| (8) | 427 | 10.6 | 249 | .11 | .012 | 7.69 | 178 | 3.23 | .64 | 2.03 |

As can be observed from the above table the crystallizations conducted at a pH greater than about 11.5, i.e., (1), (2) and (3), had significant quantities of vanadium in the trisodium orthophosphate crystals, in fact, about as much or more vanadium on a weight basis than remained in the mother liquor. However, for crystallizations conducted at a pH of about 11.5 or less, i.e., (4), (5), (6), (7) and (8), a significant reduction in the vanadium content of the trisodium orthophosphate crystals can be observed with a phosphorus recovery in each instance greater than about 50% and usually about 80% by weight. The foregoing dramatically illustrates the ability to separate vanadium values and phosphorus values from an aqueous leach liquor of a soda roast ferrophosphorus by pH adjustment to about 11.5 or less.

*Example II*

In this example about 300 parts of trisodium orthophosphate crystals recovered from ferrophosphorus by the processs of the instant invention were added to a reaction vessel containing about 600 parts of a slurry made of about 20% by weight of calcium hydroxide and about 80% by weight of water. The batch was agitated and allowed to react at room temperature for about 2 hours, the contents filtered and the NaOH concentration of the filtrate and washings was determined by titration with ½ N HCl, using phenophthalein and methyl orange as indicators. The same reaction was also conducted under the same conditions using 20% excess by weight of calcium hydroxide and using 40% excess by weight of calcium hydroxide. The following table indicates the results of the tests:

TABLE 2

| | Percent Ca(OH)$_2$ in slurry | Percent excess Ca(OH)$_2$ | Percent NaOH Recovery |
|---|---|---|---|
| (1) | 13.3 | 0 | 87.0 |
| (2) | 13.3 | 20 | 100.0 |
| (3) | 13.3 | 40 | 100.0 |
| (4) | 16.7 | 20 | 89.6 |

As can be observed from the above table, the precent NaOH recovery is above about 80 percent when using stoichiometric amounts of Ca(OH)$_2$ and when using excess Ca(OH)$_2$ the percent NaOH recovery is about 100%. This dramatically illustrates the ability to recover the NaOH for reuse in the soda roast operation and to recover calcium phosphates for reuse as feed to the electric furnace for production of elemental phosphorous.

What is claimed is:
1. A method for recovering trisodium orthosphate values substantially free of vanadium values from soda roast ferrophosphorous containing vandadium values and characterized as being over about 75% oxidized and containing over about 20% by weight of sodium comprising leaching said ferrophosphorus with an aqueous solvent consisting essentially of water and having a pH between about 6 and 8 whereby the phosphorus values and the vanadium values present in said ferrophosphorous are solubilized therein and whereby the pH of the resulting aqueous solution is above 11.5, adjusting the pH of said resulting aqueous solution to between about 10.5 and about 11.5 with an acidic material soluble in an alkaline solution and having a pK greater than about 4, crystallizing said trisodium orthophosphate values from said resulting aqueous solution at a temperature above about

25° C., and removing said crystals from said resulting aqueous solution.

2. The method of claim 1 wherein said acidic material is an inorganic acid selected from the class consisting of sulfuric acid, phosphoric acid, hydrochloric acid, nitric acid, and mixtures thereof.

3. A method for recovering trisodium orthophosphate substantially free of vanadium values from soda roast ferrophosphorus containing vanadium values and characterized as being over about 75% oxidized and containing over about 20% by weight of sodium comprising leaching said ferrophosphorous with an aqueous solvent consisting essentially of water and having a pH between about 6 and 8 and a temperature between about 60°° C. and the boiling temperature of said solvent whereby the phosporous values and the vanadium values present in said ferrophosphorous are solubilized therein and whereby the pH of the rsulting aqueous solution is above 11.5, adjusting the pH of said resulting aqueous solution to between about 10.5 and about 11.5 by means of an inorganic acid selected from the group consisting of sulfuric acid, phosphoric acid, hydrochloric acid, nitric acid, and mixtures thereof, crystallizing said trisodium orthophosphate values from said resulting aqueous solution by lowering the temperature of said solution to between about 25° C. and about 55° C. and removing said crystals from said aqueous solution.

References Cited
UNITED STATES PATENTS 2,654,655   10/1953   Banning et al. _____ 23—107

OSCAR R. VERTIZ, *Primary Examiner.*

O. F. CRUTCHFIELD, *Assistant Examiner.*